Figure 8:
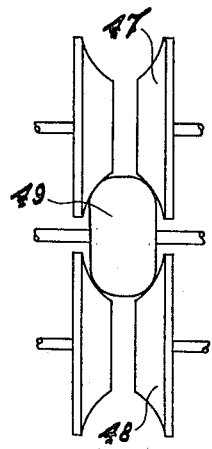

Nov. 15, 1966  O. SINGER  3,285,083
INFINITELY VARIABLE SPEED TRANSMISSION APPARATUS
Filed July 9, 1964  3 Sheets-Sheet 1
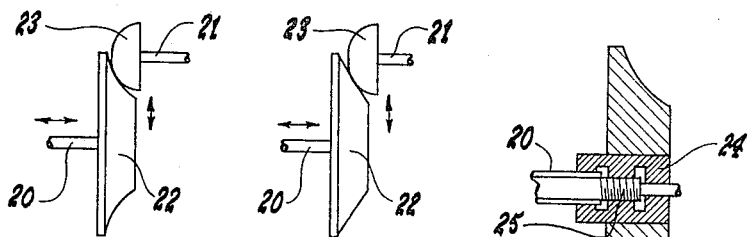
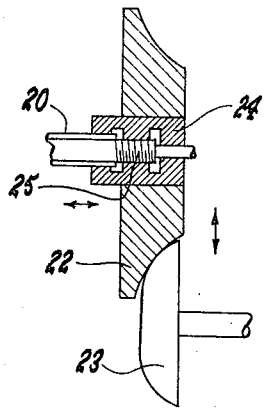
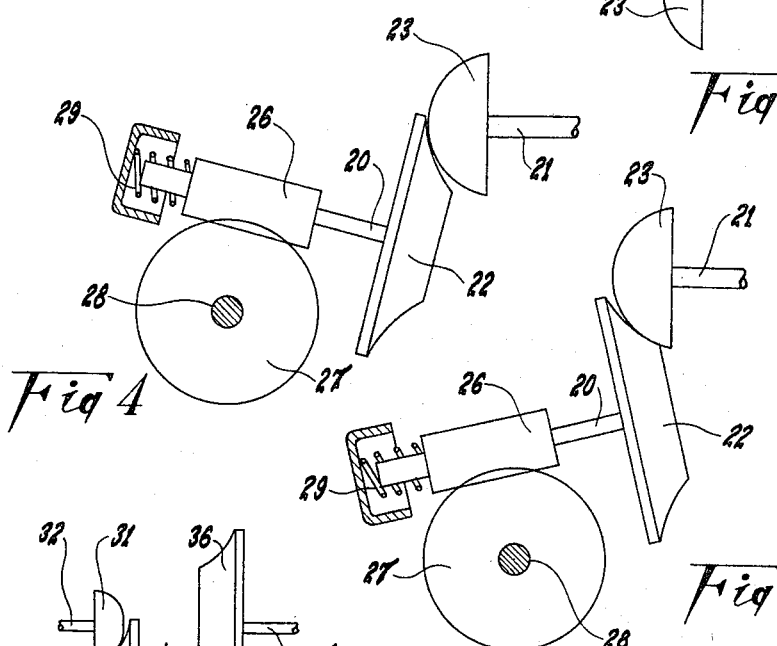
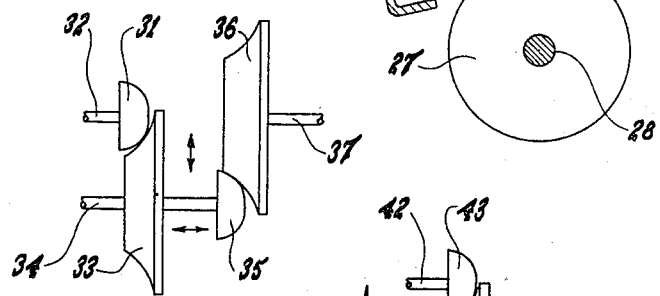
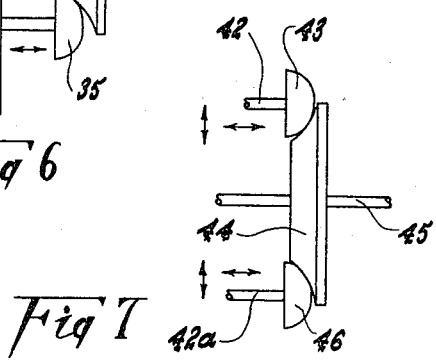
INVENTOR
OTTO SINGER
By Young & Thompson
ATTY Nov. 15, 1966  O. SINGER  3,285,083
INFINITELY VARIABLE SPEED TRANSMISSION APPARATUS
Filed July 9, 1964  3 Sheets-Sheet 2

INVENTOR
OTTO SINGER
By Young & Thompson
ATTY

Nov. 15, 1966 O. SINGER 3,285,083
INFINITELY VARIABLE SPEED TRANSMISSION APPARATUS
Filed July 9, 1964 3 Sheets-Sheet 3

INVENTOR
OTTO SINGER
By Young + Thompson
ATTY.

United States Patent Office 3,285,083
Patented Nov. 15, 1966

3,285,083
INFINITELY VARIABLE SPEED TRANSMISSION
APPARATUS
Otto Singer, East Malvern, Victoria, Australia, assignor to Silentbloc (Australia) Proprietary Limited, Victoria, Australia, a corporation of Victoria
Filed July 9, 1964, Ser. No. 381,483
22 Claims. (Cl. 74—191)

The present invention relates to infinitely variable speed transmission apparatus.

Hitherto many attempts have been made to produce effective infinitely variable speed transmission apparatus but although some efficient, reliable and relatively noiseless variable speed drive units have been produced they are not entirely suitable for use in some applications. Furthermore they are usually expensive. It is the primary object of the present invention to provide an inexpensive unit which is eminently suitable for use in establishments where the cost of the earlier units is not fully justified.

According to the invention infinitely variable speed transmission apparatus comprises a drive shaft, a driven shaft located in operable relationship to the drive shaft, means keyed to the shafts for operatively connecting the drive shaft to the driven shaft and including at least one pair of disc like elements, each element of a pair including a portion of gradually decreasing radius with the radius of the portion on one element decreasing in the opposite direction to the portion on the other element so as to form a circumferential edge portion on one element of convex curvature and a circumferential edge portion on the other element which is either of concave curvature with a radius of curvature greater than that of the first mentioned element or is substantially flat so that its radius of curvature is infinite, force developing means for forcing the circumferential edge portions of the elements into operative engagement with each other so that one element will rotate the other and a substantially circular path will be described on each circumferential edge portion as the elements rotate, and means for changing the positions of the shafts with respect to each other so as to change the location of the engaging positions on the circumferential edge portions of the elements to lengthen and shorten the contact paths thereon thereby to vary the relative speeds of rotation of the driving shaft and driven shaft.

Figure 9:
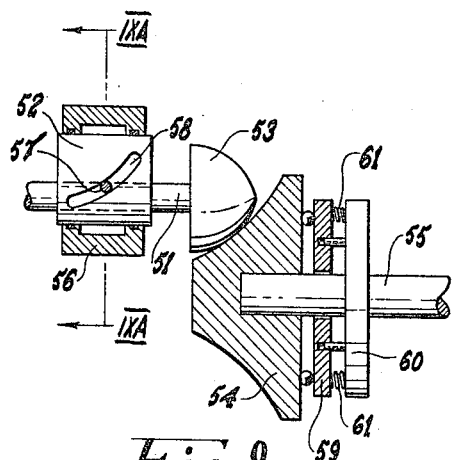
Figure 10:
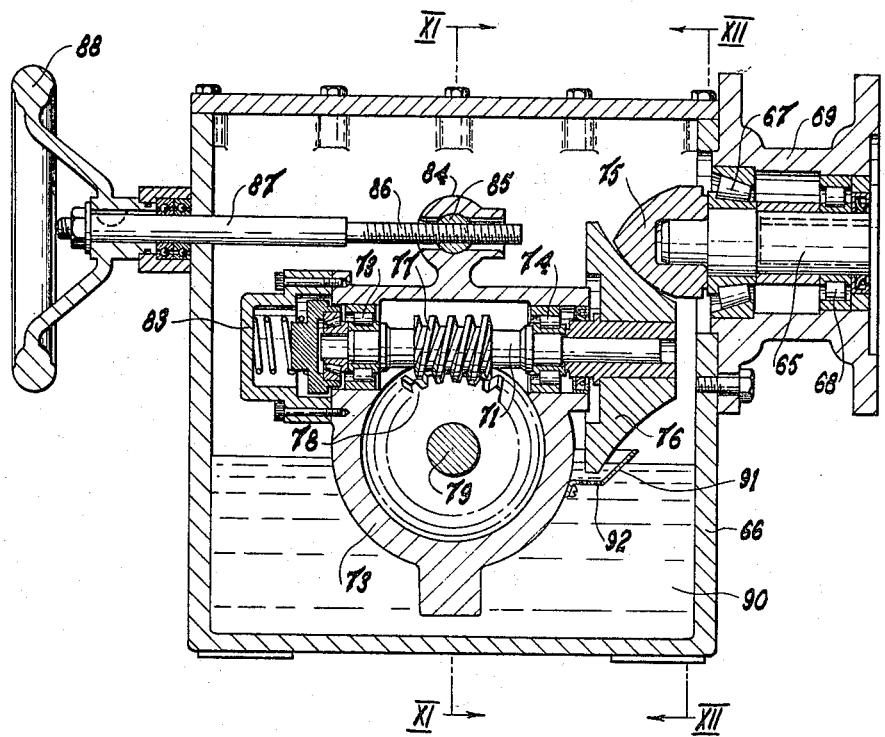
Figure 11:
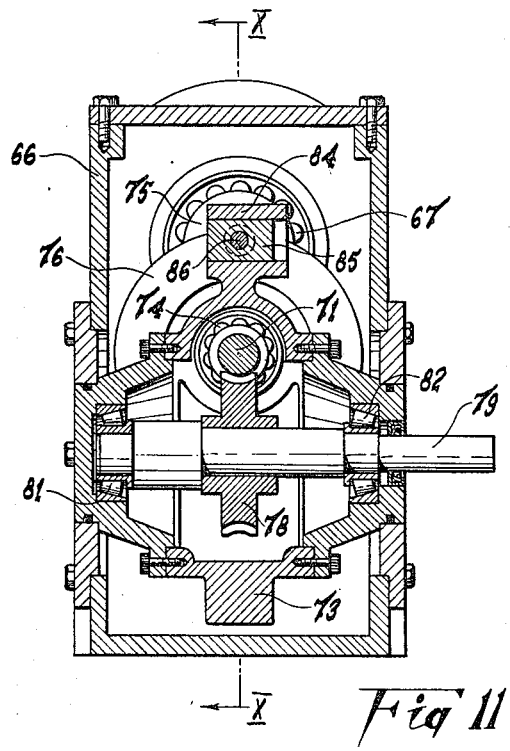
Figure 12:
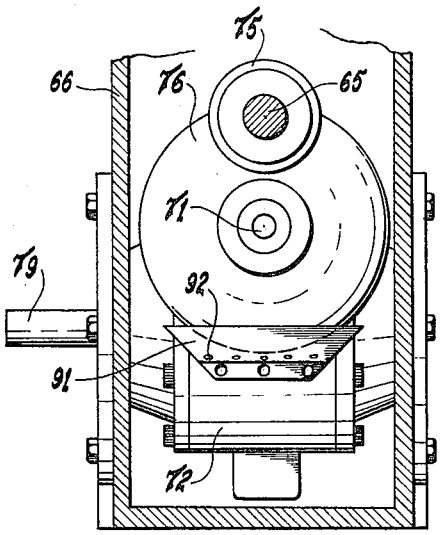

In order that the invention may be readily understood reference is made to the accompanying drawings in which:

FIGURES 1 to 9 and 9a illustrate embodiments of the invention incorporating rotatable disc like elements for transmitting motion from a drive shaft to a driven shaft; and FIGURES 10, 11 and 12 illustrate a preferred embodiment of the invention, FIGURE 10 being a longitudinal sectional view taken on the line X—X of FIGURE 11 and FIGURES 11 and 12 being cross sectional views taken on the lines XI—XI and XII—XII of FIGURE 10.

Referring to FIGURE 1 motion is transmitted between the shafts 20 and 21 by a pair of rotatable disc like elements 22 and 23 which are keyed to the shafts and which have their circumferential edges in engagement so that one element will rotate the other. Either shaft may be the drive shaft or driven shaft. The elements each include portions of gradually decreasing radius with the radius of the portion on one element decreasing in the opposite direction to the portion on the other as illustrated in the figure. The circumferential edge portion of the element 23 is of convex curvature and the circumferential edge portion of the element 22 is of concave curvature with a radius of curvature greater than that of the element 23. As the elements rotate a circular contact path will be described on the circumferential edge portion of each element and the speed of rotation of one element relative to the speed of rotation of the other element will be proportional to the lengths of the circular contact paths. In order to lengthen or shorten the contact paths so as to vary the relative speeds of rotation of the elements and, in turn, the relative speeds of rotation of the shaft 20 and the shaft 21, the positions of the shafts with respect to each other may be changed by moving the shafts in the direction of the arrows by any suitable means so that the distance between the centres of the shafts are varied.

The embodiment of FIGURE 2 is similar to that of FIGURE 1; however, the element 22 has a substantially flat circumferential edge portion so that its radius of curvature is infinite.

In the embodiment shown in FIGURE 3 the element 22 is keyed to the shaft 20 by a bush 24 which is adapted to be moved axially along the shaft 20 by a screw thread 25 formed on the shaft 20 until the element 22 engages the element 23. The element 22 thus engages the element 23 by a force which is proportional to the transmitted power.

FIGURES 4 and 5 illustrate an embodiment in which a worm or helical gear 26 is operatively associated with a toothed gear 27 on a shaft 28. In this embodiment the lengths of the contact path are varied by turning the shaft 20, the element 22, worm 26 and gear 27 as a unit through an angle with respect to the shaft 21 and element 23. In the position of FIGURE 4 the greatest difference between the speeds of rotation of the shafts 20 and 21 will be obtained whilst in the position of FIGURE 5 the least difference in the relative speeds of rotation of the shafts 20 and 21 will be obtained. The initial pressure to force the element 22 into engagement with the element 23 is developed by a spring 29 whilst the back thrust or reaction developed by the toothed gear 27 maintains the elements in operative engagement.

In FIGURE 6 is illustrated an embodiment including two pairs of elements which operatively connect a shaft 32, which may be the drive shaft, and a shaft 37 which may be the driven shaft. The element 31 rotates the element 33 keyed to an idler shaft 34 whilst the element 35 keyed to the idler shaft 34 rotates the element 36 on the shaft 37. In this embodiment the shaft 32 and the shaft 37 may be located in axial alignment and the idler shaft 34 may extend parallel thereto. The positions of the idler shaft 34 and the shafts 32 and 37 may be changed as previously described in connection with the embodiment of FIGURE 1. The variation in speed given by the first pair of elements in this embodiment is multiplied by the variation in speed given by the second pair of elements.

The embodiment illustrated in FIGURE 7 is similar to the embodiment of FIGURE 6 except that three elements are employed which operatively connect a shaft 42, which may be the drive shaft, and a shaft 42a, which may be the driven shaft. The element 43 rotates the element 44 keyed to an idler shaft 45 and, in effect, the elements 43 and 44 form one pair of elements. The element 44 rotates the element 46 and, in effect, the elements 44 and 46 form another pair of elements.

In this embodiment the driving shaft and the driven shaft may extend parallel to each other with the idler shaft located therebetween parallel to the other shafts.

The embodiment of FIGURE 8 is similar to the embodiment of FIGURE 7 and incorporates elements 47 and 48 having double concave circumferential edge portions and an intermediate element 49 of generally convex lens-like configuration.

Figure 9A:
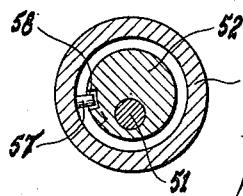

FIGURES 9 and 9a illustrate an embodiment in which a shaft 51, for example the drive shaft, is adapted to rotate in a cylindrical cage 52 on an axis which is located in an off-centre position with respect to the longitudinal axis of the cage. Keyed to the shaft 51 is an element 53 which co-operates with an element 54 keyed to the shaft 55, for example the driven shaft. The cage 52 is rotatably supported in a frame 56 to which it may be keyed by a pin 57 located in a slot 58 formed in the cage. The slot 58 has a radius of curvature which is proportional to the radius of curvature of the circumferential edge portion of the element 54 so that the location of the engaging positions of the elements 53 and 54 can be changed by loosening the pin 57 and rotating the cage 52 to another position. The elements 53 and 54 are forced into engagement by a plate 59 which is influenced towards the element 54 by the plate 60 and the springs 61 which in conjunction with the balls 62 act as a torque reaction device.

FIGURES 10, 11 and 12 illustrate an embodiment of the invention which is similar to the embodiment of FIGURES 4 and 5. A drive shaft 65 is rotatably supported on a housing 66 and is adapted to rotate in bearings 67 and 68 in a cage 69. The driven shaft 71 is supported in a framework 72 and is adapted to rotate in bearings 73 and 74. The drive shaft 65 and the driven shaft 71 are operatively connected together by elements 75 and 76 in accordance with the invention.

Keyed to the driven shaft 71 is a worm or helical gear 77 which engages a toothed gear 78 keyed to the transverse shaft 79 extending substantially at right angles to the driven shaft 71 and adapted to rotate in bearings 81 and 82 in the housing 66. The elements 75 and 76 are forced into engagement with each other by a spring 83 which influences the driven shaft 71 in an axial direction towards the drive shaft 65. As seen in FIG. 10, there is nothing other than driving element 75 that prevents movement of shaft 71 in a helical path toward the right side of that figure.

In order to change the location of the engaging positions of the elements 75 and 76 the framework 72 is adapted to pivot on the shaft 79. For this purpose the framework 72 is provided with an upstanding projection 84 having a transverse pin 85 which is tapped to receive the threaded portion 86 of an operating rod 87. The operating rod 87 extends through the housing 66 and is provided with operating means such as an operating wheel 88. By rotating the operating wheel 88 the framework is pivoted bodily on the shaft 79 thus providing an infinitely variable speed adjustment between the drive shaft 65 and the driven shaft 71.

The embodiment illustrated in FIGURES 10, 11 and 12 also includes means for providing a film of oil between the circumferential edge portions of the elements 75 and 76 to operatively connect the elements so as to transmit the power from the element 75 to the element 76. Thus the circumferential edge portions of the elements 75 and 76 do not actually come into direct metal to metal contact with each other but the power is transmitted from one to the other through the film of oil.

The viscosity of the oil and the thickness of the oil film are predetermined according to various factors such as the size of the elements 75 and 76 and the desired range of speed of rotation of the elements. For instance if the film of oil is too thin there will be metal to metal contact between the elements 75 and 76 at some points at least on their circumferential edge portions and there will be excessive wear. On the other hand if the film of oil is too thick slippage will occur. The required shearing strength of the oil film to transmit the power from the element 75 to the element 76 is in accordance with the equation, $$\text{Shearing strength} = \frac{k}{\text{function } I}$$

in which $k$ is a constant and $I$ is the thickness of the oil film.

It is preferable that the circumferential edge portions of the elements 75 and 76 should have a finish of a few micro inches and that the dimensions of the elements 75 and 76 are such that the effective specific pressure at the point of contact over the full load range is never so low that slippage will occur or so high that the oil film is squeezed out from between the elements.

To provide the film of oil between the elements 75 and 76 the housing is adapted to contain a quantity of oil 90. In order to reduce turbulence in the oil and to permit the element 76 to rotate in a minimum quantity of oil so as to reduce drag an oil cup 91 is provided. The cup 91 is attached to the framework 72, is located at a level immediately below the element 76 and is adapted to contain a secondary quantity of oil. An opening 92 of relatively small size is provided in the bottom of the cup 91.

In the operation of the embodiment of FIGURES 10, 11 and 12 oil will be distributed over the circumferential edge portion of the element 76 from the oil contained in the cup 91 to form a film on the circumferential edge portion of the element 76. Thus the oil level in the cup will fall below the main oil level in the housing 66. When this occurs the oil in the cup 91 will be slowly replenished from the oil in the housing through the opening 92. Thus the circumferential edge portion of the element 76 will always be covered by a film of oil to transmit the power between the elements 75 and 76.

In addition oil will be distributed throughout the interior of the housing to lubricate the apparatus.

Having now described my invention, what I claim as new and desire to secure by Letters Patent is:

1. Infinitely variable speed transmission apparatus comprising a drive shaft, a driven shaft located in operable relationship to the drive shaft, means keyed to said shafts for operatively connecting the drive shaft to the driven shaft and including at least one pair of disc like elements, each element of a pair including a portion of gradually decreasing radius with the radius of the portion on one element decreasing in the opposite direction to the portion on the other element so as to form a circumferential edge portion on one element of convex curvature and a circumferential edge portion on the other element of concave curvature with a radius of curvature greater than that of the first mentioned element, force developing means for forcing the circumferential edge portions of the elements into operative engagement with each other so that one element will rotate the other and a substantially circular path will be described on each circumferential edge portion as the elements rotate, means for changing the positions of the shafts with respect to each other so as to change the location of the engaging positions on the circumferential edge portions of the elements to lengthen and shorten the contact paths thereon thereby to vary the relative speeds of rotation of the driving shaft and driven shaft, and means for providing a film of oil of predetermined viscosity and thickness between the circumferential edge portions on the elements to operatively connect the elements so as to transmit power from one element to the other element through the film of oil.

2. Infinitely variable speed transmission apparatus according to claim 1, wherein the circumferential edge portion of said other element is substantially flat so that its radius of curvature is infinite.

3. Infinitely variable speed transmission apparatus according to claim 1, and including two pairs of disc like elements, the elements of one pair being respectively keyed to the driving shaft and an idler shaft, and the elements of the other pair being respectively keyed to the idler shaft and the driven shaft.

4. Infinitely variable speed transmission apparatus according to claim 1, and including three disc like elements, an element keyed to the driving shaft and an intermediate element keyed to an idler shaft being adapted to co-operate to form one pair of operatively connected elements, and the intermediate element and an element keyed to the driven shaft being adapted to co-operate to form another pair of operatively connected elements.

5. Infinitely variable speed transmission apparatus according to claim 1, and including three disc like elements, an element keyed to the driving shaft and an intermediate element keyed to an idler shaft being adapted to co-operate to form one pair of operatively connected elements, and the intermediate element and an element keyed to the driven shaft being adapted to co-operate to form another pair of operatively connected elements, and wherein the elements keyed to the driving shaft and driven shaft have double concave circumferential edge portions and the intermediate element is of convex lens like configuration.

6. Infinitely variable speed transmission apparatus according to claim 1, wherein the location changing means includes an arrangement for varying the distance between the axes of the driving shaft and the driven shaft.

7. Infinitely variable speed transmission apparatus according to claim 1, wherein the location changing means includes an arrangement for turning one shaft through an angle with respect to the other.

8. Infinitely variable speed transmission apparatus according to claim 1, and including a substantially cylindrical cage in which one of the shafts is adapted to rotate on an axis located in an off-centre position with respect to the longitudinal axis of the cage, and a frame for rotatably supporting the cage so that it is capable of being rotated on its longitudinal axis thereby to vary the distance between the axes of the driving shaft and the driven shaft to change the location of the engaging positions on the circumferential edge portions of the elements.

9. Infinitely variable speed transmission apparatus according to claim 1, and including a substantially cylindrical cage in which one of the shafts is adapted to rotate on an axis located in an off-centre position with respect to the longitudinal axis of the cage, and a frame for rotatably supporting the cage so that it is capable of being rotated on its longitudinal axis thereby to vary the distance between the axes of the driving shaft and the driven shaft to change the location of the engaging positions on the circumferential edge portions of the elements, and wherein the cage is releasably keyed to the frame by a pin located in a slot formed in the cage and having a radius of curvature which is proportional to the radius of curvature of the circumferential edge portion of the element having the concave circumferential edge portion.

10. Infinitely variable speed transmission apparatus according to claim 1, wherein said force developing means comprises a torque reaction device in combination with resilient spring means for forcing the circumferential edge portions of the pair of elements into frictional engagement.

11. Infinitely variable speed transmission apparatus according to claim 10, wherein the circumferential edge portion of said other element is substantially flat so that its radius of curvature is infinite.

12. Infinitely variable speed transmission apparatus, comprising a housing, a drive shaft and a driven shaft mounted in said housing in operable relationship, means keyed to said shafts for operatively connecting the drive shaft to the driven shaft and including a pair of disc like elements, each element of the pair including a portion of gradually decreasing radius with the radius of the portion on one element decreasing in the opposite direction to the portion on the other element so as to form a circumferential edge portion on one element of convex curvature and a circumferential edge portion on the other element of concave curvature with a radius of curvature greater than that of the first mentioned element, force developing means for forcing the circumferential edge portions of the elements into operative engagement with each other so that one element will rotate the other and a substantially circular path will be described on each circumferential edge portion as the elements rotate, means for turning the driven shaft and the element mounted thereon on an axis at right angles to the longitudinal axis of the driven shaft through an angle with respect to the driving shaft so as to change the location of the engaging positions on the circumferential edge portions of the elements thereby to lengthen and shorten the contact paths on the elements and vary the relative speeds of rotation of the driving shaft and the driven shaft, and means for providing a film of oil of predetermined viscosity and thickness between the circumferential edge portions on the elements to operatively connect the elements so as to transmit power from one element to the other element through the film of oil.

13. Infinitely variable speed transmission apparatus according to claim 12, wherein the force developing means comprises resilient spring means for developing a force in the direction of the axis of the driven shaft initially to bring the elements into engagement, and a worm or helical gear keyed to the driven shaft and adapted to mesh with a toothed gear keyed to a transverse shaft mounted in said casing at substantially right angles to the driving shaft, so that the driven shaft is urged in the direction of its axis to force the circumferential edge portions of the elements together by a force which is proportional to the load on the driven shaft.

14. Infinitely variable speed transmission apparatus according to claim 12, wherein the force developing means comprises resilient spring means for developing a force in the direction of the axis of the driven shaft initially to bring the elements into engagement, and a worm or helical gear keyed to the driven shaft and adapted to mesh with a toothed gear keyed to a transverse shaft mounted in said casing at substantially right angles to the driving shaft, so that the driven shaft is urged in the direction of its axis to force the circumferential edge portions of the elements together by a force which is proportional to the load on the driven shaft, and wherein the means for turning the driven shaft includes a framework for supporting the driven shaft and which is adapted to pivot on the transverse shaft and to be operatively connected to operating means located externally of the housing.

15. Infinitely variable speed transmission apparatus comprising a housing, a drive shaft and a driven shaft mounted in said housing in operable relationship, means keyed to said shafts for operatively connecting the drive shaft to the driven shaft and including a pair of disc like elements, each element of the pair including a portion of gradually decreasing radius with the radius of the portion on one element decreasing in the opposite direction to the portion on the other element so as to form a circumferential edge portion on one element of convex curvature and a circumferential edge portion on the other element of concave curvature with a radius of curvature greater than that of the first mentioned element, force developing means for forcing the said circumferential edge portions of the elements into operative engagement with each other so that one element will rotate the other and a substantially circular path will be described on each circumferential edge portion as the elements rotate, means for changing the positions of the shafts with respect to each other so as to change the location of the engaging positions on the circumferential edge portions of the elements to lengthen and shorten the contact paths thereon thereby to vary the relative speeds of rotation of the driving shaft and driven shaft, and means for providing a film of oil of predetermined viscosity and thickness between the circumferential edge portions on the elements to operatively connect the elements so as to transmit power from one element to the other element through the film of oil.

16. Infinitely variable speed transmission apparatus according to claim 15, wherein the circumferential edge portion of said other element is substantially flat so that its radius of curvature is infinite.

17. Infinitely variable speed transmission apparatus comprising a housing, a drive shaft and a driven shaft mounted in said housing in operable relationship, means keyed to said shafts for operatively connecting the drive shaft to the driven shaft and including a pair of disc like elements, each element of the pair including a portion of gradually decreasing radius with the radius of the portion on one element decreasing in the opposite direction to the portion on the other element so as to form a circumferential edge portion on one element of convex curvature and a circumferential edge portion on the other element of concave curvature with a radius of curvature greater than that of the first mentioned element, force developing means for forcing the said circumferential edge portions of the elements into operative engagement with each other so that one element will rotate the other and a substantially circular path will be described on each circumferential edge portion as the elements rotate, means for turning the driven shaft and the element mounted thereon on an axis at right angles to the longitudinal axis of the driven shaft through an angle with respect to the driving shaft so as to change the location of the engaging positions on the circumferential edge portions of the elements thereby to lengthen and shorten the contact paths on the elements and vary the relative speeds of rotation of the driving shaft and the driven shaft, and means for providing a film of oil of predetermined viscosity and thickness between the circumferential edge portions on the elements to operatively connect the elements so as to transmit power from one element to the other element through the film of oil.

18. Infinitely variable speed transmission apparatus according to claim 17, wherein the circumferential edge portion of said other element is substantially flat so that its radius of curvature is infinite.

19. Infinitely variable speed transmission apparatus according to claim 17, wherein said force developing means comprises a torque device in combination with resilient spring means for forcing the circumferential edge portions of the pairs of elements into driving engagement.

20. Infinitely variable speed transmission apparatus according to claim 17, wherein the force developing means comprises resilient spring means for developing a force in the direction of the axis of the driven shaft initially to bring the elements into engagement, and a worm or helical gear keyed to the driven shaft and adapted to mesh with a toothed gear keyed to a transverse shaft mounted in said casing at substantially right angles to the driving shaft, so that the driven shaft is urged in the direction of its axis, to force the circumferential edge portions of the elements together by a force which is proportional to the load on the driven shaft.

21. Infinitely variable speed transmission apparatus according to claim 17, wherein the force developing means comprises resilient spring means for developing a force in the direction of the axis of the driven shaft initially to bring the elements into engagement, and worm or helical gear keyed to the driven shaft and adapted to mesh with a toothed gear keyed to a transverse shaft mounted in said casing at substantially right angles to the driving shaft, so that the driven shaft is urged in the direction of its axis to force the circumferential edge portions of the elements together by a force which is proportional to the load on the driven shaft, and wherein the means for turning the driven shaft includes a framework for supporting the driven shaft and which is adapted to pivot on the transverse shaft and to be operatively connected to operating means located externally of the housing.

22. Infinitely variable speed transmission apparatus according to claim 17, wherein the housing is adapted to contain a quantity of oil of predetermined viscosity, and the apparatus includes an oil cup which is adapted to contain a secondary quantity of the oil and which is located within the housing at a level immediately below the element mounted on the driven shaft so that the element will rotate in the oil contained therein and a film of oil of predetermined thickness will be provided on the circumferential edge portion thereof, the oil cup having an opening in the bottom thereof to permit the oil therein to be replenished from the quantity of oil in the housing when its level falls below the level of the oil in the housing.

References Cited by the Examiner
UNITED STATES PATENTS

| | | | |
|---|---|---|---|
| 1,181,218 | 5/1916 | Fullerton | 74—191 |
| 2,252,630 | 8/1941 | Heer | 74—191 |
| 2,570,493 | 10/1951 | Schmidt | 74—193 |
| 2,584,541 | 2/1952 | Brobeck | 74—191 |
| 2,734,389 | 2/1956 | Strecker | 74—200 |

FOREIGN PATENTS 446,325     9/1912     France.

DAVID J. WILLIAMOWSKY, *Primary Examiner.*

J. H. GERIN, *Assistant Examiner.*